Feb. 25, 1958 R. C. PALMER 2,824,908

METHOD AND APPARATUS FOR MULTIPLEX SIGNALING

Filed Aug. 7, 1952 2 Sheets-Sheet 1

INVENTOR.
RICHARD C. PALMER

BY Darby & Darby

ATTORNEYS

METHOD AND APPARATUS FOR MULTIPLEX SIGNALING

Filed Aug. 7, 1952 2 Sheets-Sheet 2

INVENTOR.
RICHARD C. PALMER
BY Darby & Darby
ATTORNEYS

United States Patent Office 2,824,908

Patented Feb. 25, 1958

2,824,908

TELEVISION SYSTEM METHOD AND APPARATUS FOR MULTIPLEX SIGNALING

Richard C. Palmer, Pompton Plains, N. J., assignor to Allen B. Du Mont Laboratories, Inc., Clifton, N. J., a corporation of Delaware Application August 7, 1952, Serial No. 303,049

5 Claims. (Cl. 179—15)

This invention relates to television systems and apparatus for the transmission of picture signals, and particularly, of color signals.

This invention falls into the general category of transmission systems in which several separate signals are multiplexed together to be transmitted simultaneously. Specifically, these signals may be representative of the color components of a television image and may be multiplexed by time modulating the leading and/or lagging edges of pulses the amplitude of which is varied in accordance with still another signal.

One object of this invention is to provide an improved television system, and particularly an improved color television system.

Other objects are to provide a single-carrier television system and to provide a color television system suitable for operation in the same bandwidth as is presently allocated for the transmission of a black-and-white television signal.

Still other objects are to provide a television system taking advantage of the spectrum-saving characteristics of pulse time modulation, and to make use of pulse time modulation by serrating a brightness signal with pulses, the leading and lagging edges of which are time modulated with other signals.

Still further objects are to provide electrical circuits for the encoding and decoding of such signals.

Figures 1, 2:
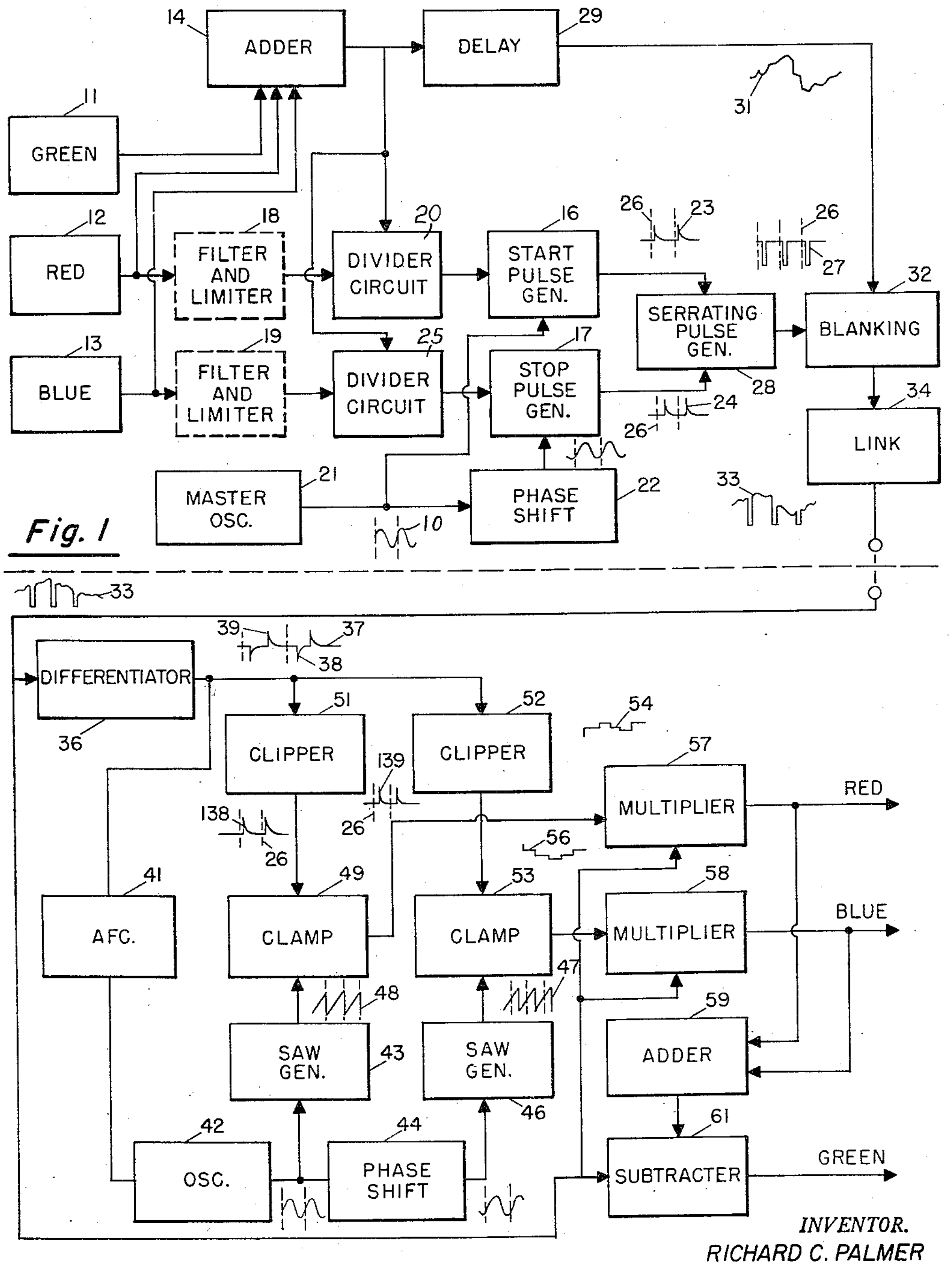
Figure 3:
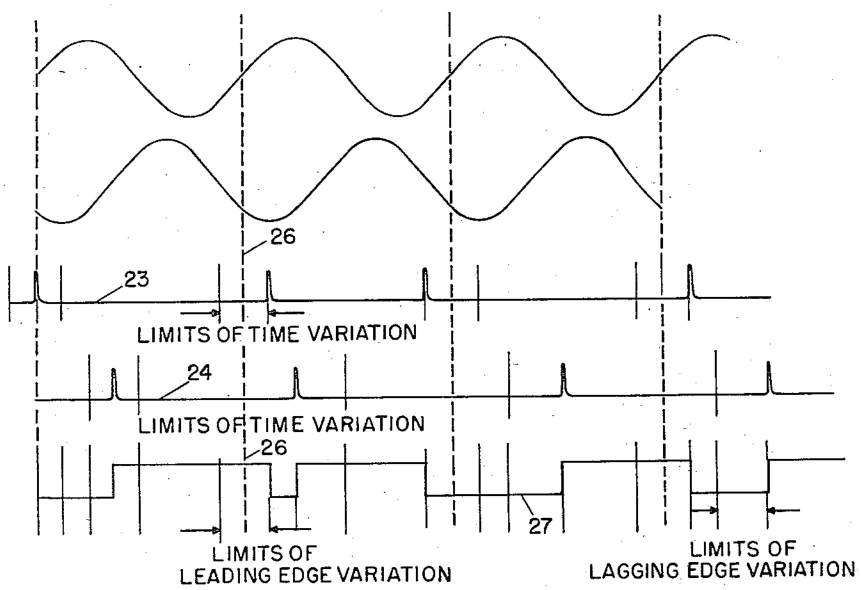
Figure 4:
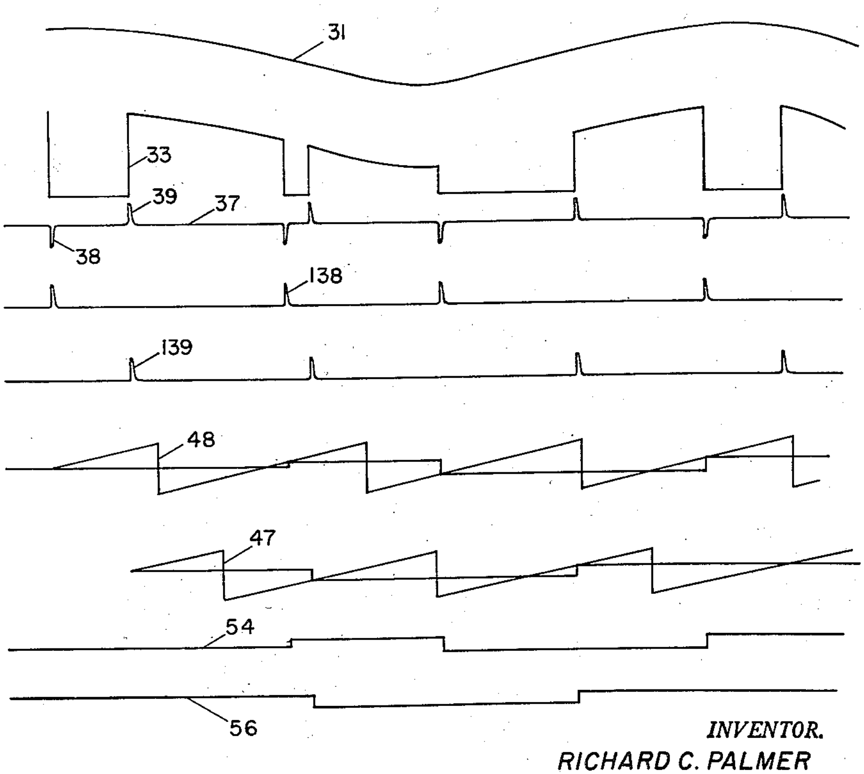

Other objects will be apparent after studying the following specification together with the drawings, in which Figure 1 is a block diagram of the encoding circuits used at the transmitting location to develop a composite television signal according to the system;

Figure 2 is a block diagram of the decoding circuits used at the receiving location to transform the signal sent out by the transmitter into television signals suitable for operating monitoring equipment; and Figures 3 and 4 represent coordinated waveforms showing the generation and modulation of signals.

Briefly, the television system forming the subject of this invention comprises the generation of a television signal representing the brightness of the image to be transmitted.

For the transmission of color images, the brightness signal is generated by adding brightness signals corresponding to the three component colors or to two component colors, if a two-color system is used, or if the third color is transmitted in some other way. Signals representing two of the color components are applied to pulse time modulators to adjust the timing of pulses with respect to a reference timing in accordance with the instantaneous amplitude of each of these signals. The two sets of pulses thus produced, are used to time the leading and lagging edges of each pulse in a series of rectangular pulses produced by a rectangular pulse generator. The rectangular pulses thus modulated are used as blanking, or serrating, pulses to reduce the amplitude of the brightness signal periodically to a fixed level which is usually the black level of the signal.

At the receiving location, the serrated brightness signal is picked up and directed into two transmission paths, one of which includes circuits for demodulating the time-modulated leading and lagging edges. The two signals thus produced are multiplied by the brightness signal from the other transmission path in order to transform the percentage brightness signals at the outputs of the time demodulators into true brightness signals. These two true brightness signals are added together and the sum subtracted from the signal in the second transmission path. This subtraction process recreates the third true brightness signal corresponding to the third color component of the image. Though the system will be described as a color television transmission system it will be apparent to those skilled in the art that other types of information may be multiplexed together. Such other types include stereoscopic information and information regarding higher resolution components of an image.

Referring to Figure 1, electrical signals corresponding to the green color components of television image are generated in a source 11, those corresponding to red in a source 12, and those corresponding to blue in a source 13. These sources may be separate cameras, flying-spot scanners, or any other means for generating the desired signals, which are then applied to a mixer, or adder, 14. In addition, the signal from source 12 is appplied to a start-pulse generator 16 and that from source 13 to a stop-pulse generator 17 by means of connections which may include bandpass filters and limiters 18 and 19 respectively. These filters and limiters may be desirable to restrain the signals corresponding to the red and blue color information within predetermined bounds of frequency and amplitude.

Unless the signal voltages from sources 12 and 13 are each proportioned to the white signal synthesized in adding mixer 14, it is necessary to place at some point in the signal paths from sources 12 and 13, respectively, circuit means to ensure the proper proportionality. Such a circuit is indicated by reference character 20 in the signal path leading from filter 18 (although it might equally well be inserted in the path leading to the filter 18). Circuit 20 forms a signal representing the ratio of the so-called red signal to the total, or white, signal. Such a circuit is disclosed in my copending application Ser. No. 303,050, entitled "Reciprocal Analog Electrical Circuit," filed concurrently herewith. The above application describes a dividing circuit comprising a multi-grid tube which inherently multiplies input signals applied to the separate grids. The input signal corresponding to the divisor is first inverted, so that the tube electronically performs the process of division by inverting the divisor and then multiplying it by the dividend—the result being a quotient rather than a product. A similar circuit 25 is connected to the output of filter 19 to form the ratio of the so-called blue signal to the white signal.

The substantially rectangular pulses produced by generator 16 are timed by the sine wave 10 from a master oscillator 21, while pulses from generator 17 are timed by the sine wave 11 formed by sending wave 10 through a phase shifting circuit 22. The phase shifting circuit 22 provides the equivalent time delay necessary to delay the center position of the lagging edges of the serrating pulses from the center position of the leading edges. The timing of the leading and lagging edges about their center positions is determined by the pulses, illustrated by waveforms 23 and 24, from generators 16 and 17, respectively, which are time-modulated in the well known way by the output signals from filters 18 and 19. The dotted lines 26 shown in waveforms 23 and 24 indicate a convenient reference time with respect to which both sets of pulses 23 and 24 are delayed.

The limits of variation of pulses 23 and 24 with respect to the reference time 26 are determined by the limiter-filters 18 and 19. The serrating pulses 27 are formed in a generator 28, which may be a bi-stable oscillator, or flip-flop circuit, and which is shifted from one condition of stability to the other by pulses 23 and back again by pulses 24. It should be noted that the pulses 27 comprise two groups of edges, leading edges and lagging edges, and that either of these groups may be time-modulated by the output signals of filters 18 or 19.

The output signal from adder 14 represents the sum of the individual brightness signals for the three color components and, hence, is the same as the so-called black and white type of signal currently being used in the television art. This signal is delayed in the delay circuit 29 by the length of time necessary to make the color information encoded into the pulses 27 pertain to the portion of the brightness signal, represented by waveform 31, which, before delay, would have occupied the next succeeding interval of time. The reasons for this will become more apparent in the discussion of the decoding circuit of Figure 2.

The brightness signal 31 is applied to a blanking circuit 32 to which the pulses 27 are also connected to produce an output signal represented by the serrated waveform 33. Signal 33 may be generated by using pulses 27 as blanking pulses to reduce the amplitude of signal 31 to a fixed level, such as the black level, or signal 31 may be used as a clipping or multiplying signal to clip or multiply the amplitude of pulses 27 to the desired level.

The output signal 33 from the blanking circuit 32 is applied to a utilization device designated in Figure 1 as a link 34, which comprises all of the radio frequency circuits necessary to connect the encoding circuit illustrated in Figure 1 with the decoding circuit illustrated in Figure 2. The signal 33 is regained at the output of the link 34 and is applied to a circuit shown in Figure 2 to a differentiating circuit 36 and to other parts of the decoding circuit as will be described later.

The effect of the differentiating circuit 36 on the signal 33 is to produce a signal, shown as waveform 37, consisting of alternate positive and negative spike voltage pulses in which the negative pulses 38 correspond to the pulse 23 and positive pulses 39 correspond to the pulses 24. These pulses are applied to an automatic frequency control circuit 41 to control the frequency of an oscillator 42 which is connected to a first sawtooth generating circuit 43 and, through a phase shifting circuit 44, to a second sawtooth generating circuit 46 to synchronize the operation thereof. Each of these sawtooth generating circuits 43 and 46 produces sawtooth waves having a repetition rate equal to the repetition rate of the serrating pulses 27, but the timing of the sawtooh oscillations shown in waveform 47 lags behind the timing of the oscillations shown in waveform 48 an amount determined by the phase shift of the sinusoidal wave in the shifting network 44.

The wave 37 from the differentiator 36 is applied to two parallel clipping circuits or clippers 51 and 52 which are oppositely polarized and may consist of simple diode rectifying circuits. The output signal of the clipper 51, represented by waveform 138, consists of only the negative pulses 38 and the output signal of the clipping circuit 52, represented by waveform 139, consists of only the positive pulses 39 from wave 37. These clipping circuits 51 and 52 are connected to a pair of clamping circuits or clamps 49 and 53 respectively which are rendered conductive only during the occurrence of each of the pulses 138 and 139 applied thereto.

The sawtooth wave 48 is applied from the sawtooth generator circuit 43 to the clamp 49 to form an input signal therefor. However, due to the operation, just described, of the clamp 47 the output signal of the clamp does not correspond to the entire input signal but only to that portion of the input signal which is in existence at the time the clamp circuit is rendered conductive by the pulses 138. The output signal of the clamp circuit 49 is therefore a voltage corresponding to the level attained by the sawtooth wave 48 at the occurrence of pulse 138; and due to the long time constant discharge circuit of the clamp 49, this output voltage remains reasonably constant until the occurrence of the next pulse 138 when it may shift to a new value depending on the instantaneous amplitude of the sawtooth wave 48. Thus, if the pulses 138 occur shortly after the reference time 26, the instantaneous amplitude of the wave 48 will be practically zero and hence the output voltage of the clamp 49 will also be practically zero; but if the pulses 138 occur slightly before reference time 26, the wave 48 will have attained almost its maximum value, and the output voltage will consequently be a maximum. Due to the linear shape of the sawtooth wave 48, the output signal from the clamp circuit 49 is a linear function of the timing of the pulses 138 with respect to the reference time 26.

The operation of clamp circuit 53 is identical with the operation of the clamp circuit 49 and need not be further elaborated. The signals represented by waveforms 54 and 56 forming the output signals of clamps 49 and 53 respectively may be smooth or filtered if desired, although it is unnecessary in most instances.

These waves 54 and 56 correspond to a percentage of the signal 31 and not to the exact amplitudes of the signals from sources 12 and 13 in Figure 1, and so they must be multiplied by the absolute value of signal 31 to obtain the relative values as generated in sources 12 and 13. This multiplication process is made necessary by the fact that the amplitude of the output signals 54 and 56 is independent of variations in the transmission path due to fading of the signal, in link 34, for instance, whereas the amplitude of the signal 33 varies directly with the changes in the transmission characteristics of lnk 34. Consequently, without the multiplication process, the red and blue signals would be transmitted through the link 34 without change while the green signal which is carried on the brightness portion of wave 33 might vary widely, thereby upsetting the color balance of the signal as viewed on the monitors.

Of course, if the transmission characteristics of the link 34 are accurately controlled as they might be if it were a direct wire line, or with suitable automatic gain control, there would be no disturbance of the color balance, and in fact, the entire system could be simplified to the extent of removing the adder 14 and transmitting only the signal from source 11 as the brightness portion of wave 33. In that case, the wave 33 would have the signal from source 12 coded into it in the leading edges of the pulses, the signal from source 13 coded in as the lagging edges, and the signal from source 11 coded in as the amplitude.

The multiplication for signal 54 is carried out in a multiplier circuit 57 to which the signal 33 is applied as the multiplying factor. These multipliers 57 and 58 may comprise variable-mu tubes or other multiplier circuits well known in the art and the output signals therefrom correspond to the signals generated in sources 12 and 13, or more properly to those signals as operated on by the filters and limiters 18 and 19 and may be utilized in any way that color television signals are normally utilized.

In order to recover the green component of the signal as generated in the source 11, it is necessary to subtract the red and blue components from the total signal since they were added in the adder 14 in Figure 1. This is done by adding the output signals of the multipliers 57 and 58 in an adder circuit 58 and 59, the output of which is applied as the subtrahend to a subtractor circuit 51 to which is also applied the signal 33. Since the sum of the signals corresponding to the red and blue components is subtracted from the signal corresponding to the white component, only the signal corresponding to the green component remains. This signal will be blanked by the serrations in the wave 33, but it is known to adjust the frequency of the serrations so as to produce an interlaced effect thereby cancelling out the blank portions during one television field period with unblanked portions during a succeeding television field period.

Other modifications may be made within the scope of this invention, which is therefore to be determined only by the following claims.

What is claimed is:

1. The method of multiplexing electrical signals comprising the steps of generating a series of electrical pulses having lagging and leading edges, said leading edges forming a first group and said lagging edges forming a second group; varying the timing of one of said groups of edges in accordance with a first one of said signals; separately mixing said first signal with a second signal to form a mixed signal; delaying said mixed signal by a period of time substantially equal to the period of time between successive ones of said pulses to form a delayed signal; and varying the amplitude of said pulses in accordance with said delayed signal.

2. The method of multiplexing electrical signals comprising the steps of generating a first one of said signals; generating a second one of said signals; generating a third one of said signals; linearly adding said three signals; separately filtering said first signal and said second signal; utilizing said first filtered signal to start each pulse of a series of electrical pulses in accordance with the instantaneous amplitude of said first filtered signal; utilizing said second filtered signal to terminate each pulse of said rectangular electrical pulses in accordance with the instantaneous amplitude of said second filtered signal; delaying the added signal by a period of time substantially equal to the period of time between successive ones of said pulses; and blanking the delayed signal with said rectangular pulses.

3. The method of decoding signals which have been multiplexed by time modulating one group of edges of a series of pulses according to a first electrical signal and varying the amplitude of said pulses according to the instantaneous amplitude of a second electrical signal, said method comprising the steps of demodulating said time modulated edges to form a replica of said first electrical signal; obtaining a replica of said second electrical signal corresponding to the amplitude of said pulses; multiplying said first-named replica signal by said second-named replica signal to form a third electrical signal; and subtracting said third electrical signal from said second-named replica.

4. The method of transmitting electrical signals comprising the steps of generating a first electrical signal; generating a second electrical signal; generating a series of electrical pulses, said pulses comprising a group of leading edges and a group of lagging edges; time modulating one of said groups of edges by said first signal; mixing said first and second signals to form a combined signal; delaying said combined signal varying the height of said pulses in accordance with the delayed signal to form a serrated signal, differentiating said serrated signal to form a pulse wave comprising a set of negative pulses alternating with a set of positive pulses, one of said sets of pulses corresponding to said time modulated group; demodulating said set of pulses corresponding to said time modulated group to recreate said first signal; and subtracting said recreated first signal from said serrated signal to recreate said second signal.

5. Signal transmission apparatus comprising a first source of a first electrical signal, a second source of a second electrical signal, a mixer circuit connected to both said sources to mix both said signals; a source of electrical pulses, said pulses consisting of a group of leading edges and a group of lagging edges; a time modulator connected to said first source and to said pulse source to time modulate one of said groups of edges; a delay circuit connected to said mixer circuit to delay the mixed signals by a period of time substantially equal to the period between successive ones of said pulses; a blanking circuit connected to said modulator and to said delay circuit to blank the output signal of said delay circuit by the pulses from said modulating circuit; a differentiating circuit connected to said blanking circuit; and a time demodulating circuit connected to said differentiating circuit.

References Cited in the file of this patent

UNITED STATES PATENTS

| | | |
|---|---|---|
| 2,465,371 | Grieg | Mar. 29, 1949 |
| 2,474,244 | Grieg | June 28, 1949 |
| 2,498,678 | Grieg | Feb. 28, 1950 |
| 2,641,642 | Behrand | June 9, 1953 |
| 2,677,720 | Bedford | May 4, 1954 |
| 2,684,995 | Schroeder | July 27, 1954 |

OTHER REFERENCES

"Electronics" for February 1952, pages 88–95, article entitled "Principles of NTSC Compatible Color Television."